Jan. 24, 1956
F. F. MacVICAR
2,731,781
LAWN MOWER HAVING REMOVABLE CUTTING REEL
Filed July 17, 1953
3 Sheets-Sheet 1
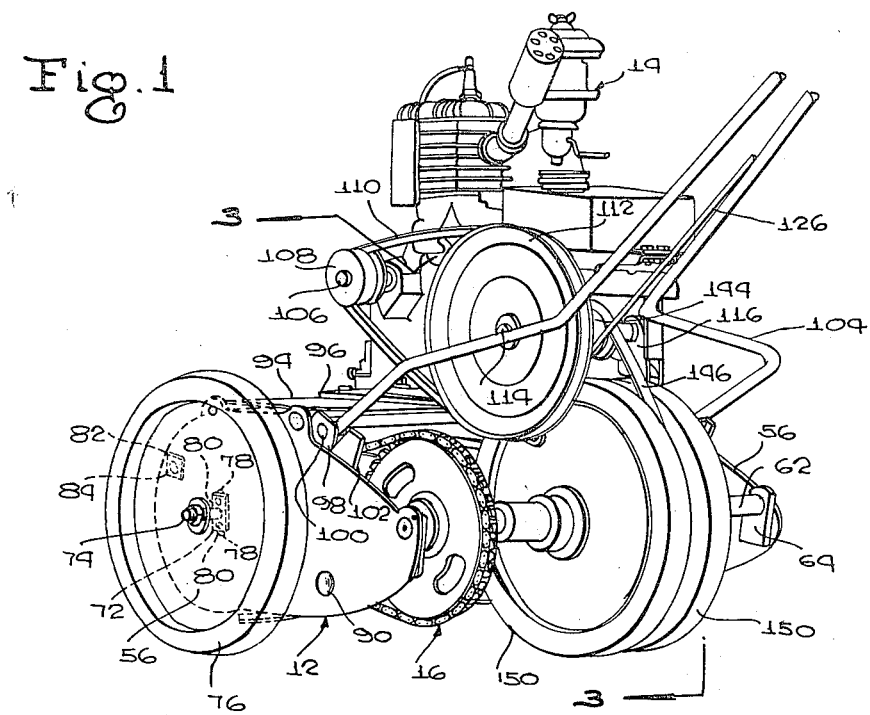
INVENTOR.
FRANK F. MACVICAR
BY
McMorrow, Berman + Davidson
ATTORNEYS

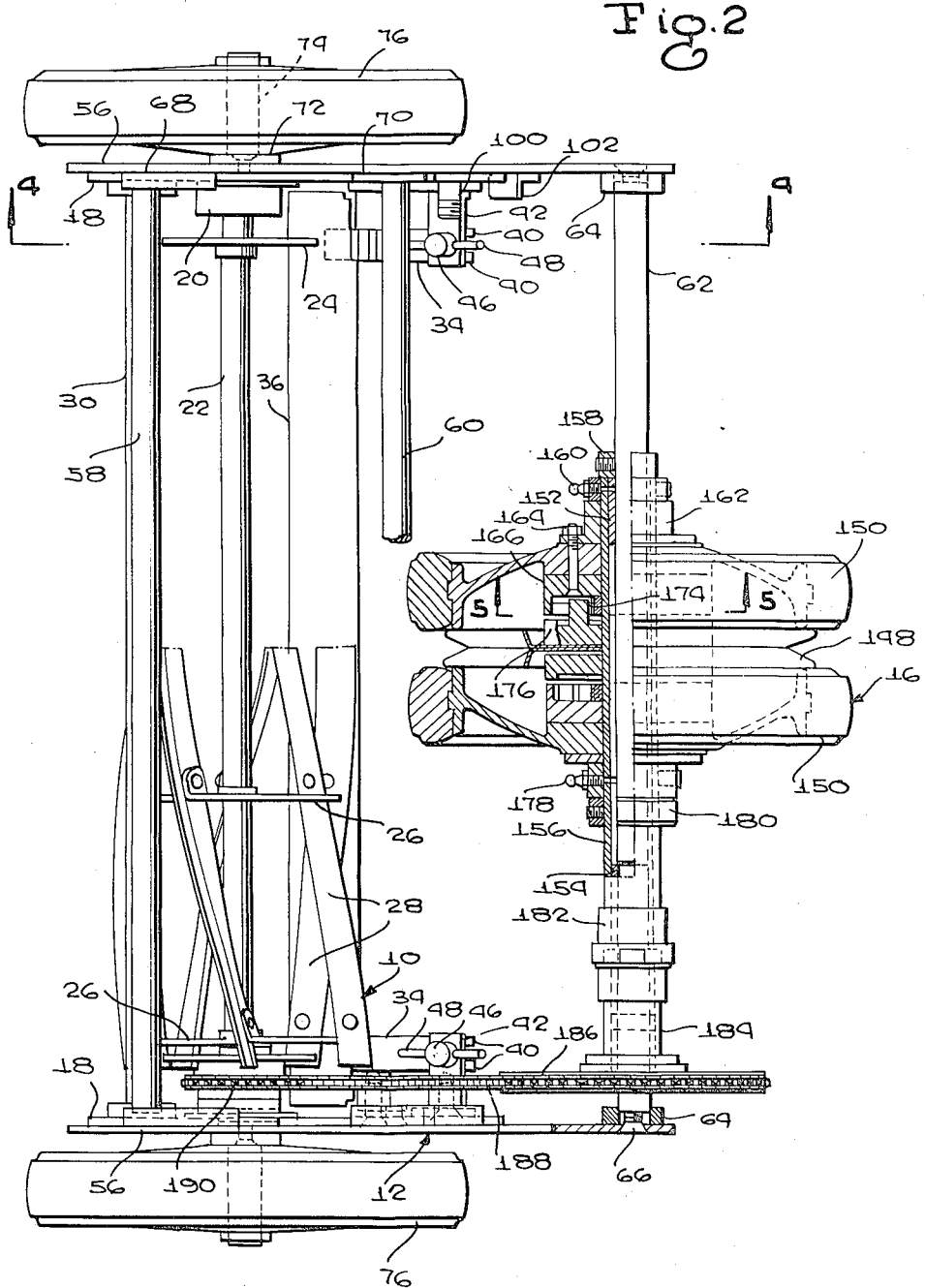

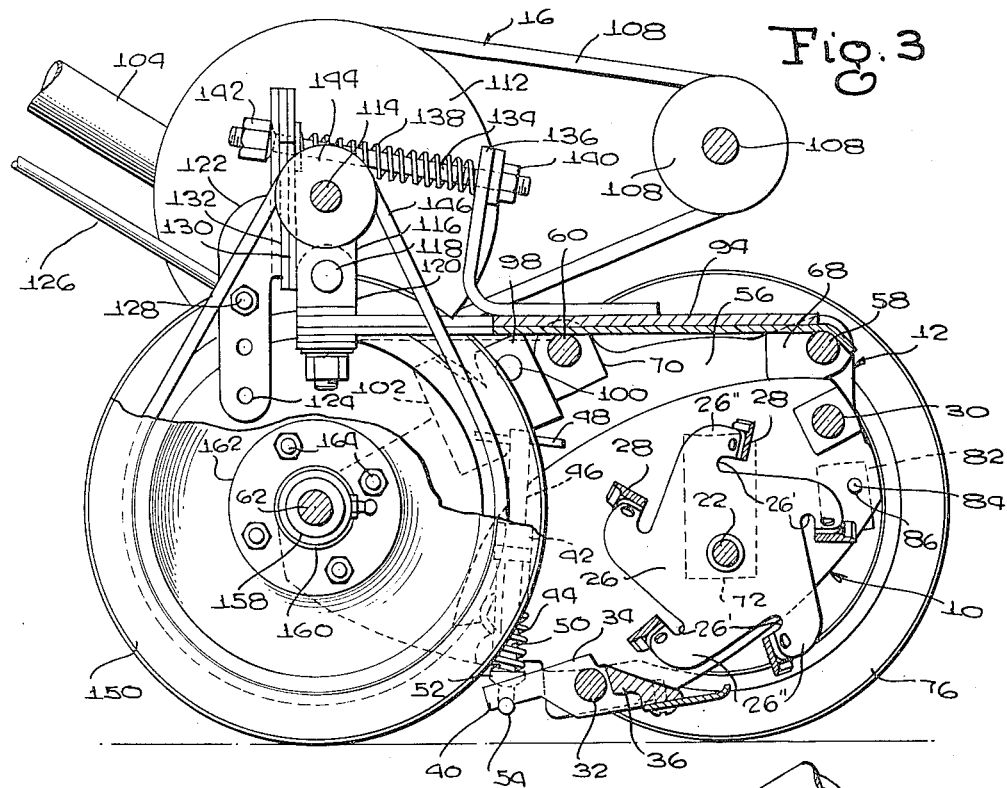

United States Patent Office 2,731,781
Patented Jan. 24, 1956

2,731,781

LAWN MOWER HAVING REMOVABLE CUTTING REEL

Frank F. MacVicar, Syracuse, N. Y.

Application July 17, 1953, Serial No. 368,797

3 Claims. (Cl. 56—249.5)

This invention relates to lawn mowers, and more particularly has reference to a lawn mower of the reel type, wherein the reel is driven by an internal combustion or electric engine mounted upon a main frame.

Heretofore, the sharpening of the blades of the reel of a mower of the type stated has involved an excessive expenditure of time and effort, so far as removing the reel from the main frame of the mower is concerned. It has been required, ordinarily, that a substantial part of the mower structure be disassembled, before access is had to the reel. Obviously, this is undesirable, and accordingly, one important object of the present invention is to provide a generally improved power lawn mower wherein the reel assembly is bodily removable from the main frame, merely through the removal of a few readily accessible fastening elements. By reason of this arrangement, it is possible to remove the reel assembly in a short period of time and with minimum difficulty, thereby to permit the blades of the reel assembly to be sharpened, after which the reel assembly can be re-inserted in the main frame and secured in place in an equally small amount of time.

Another object of importance is to provide, in a power lawn mower, a construction wherein any of various rotary, reel-type devices can be substituted for the cutting reel ordinarily mounted in the main frame. It is proposed, in this regard, to allow the cutting unit to be removed, with such devices as rotary leaf brushes, weed cutters, snow removing devices, etc., being readily substituted for the cutting unit.

Another object is to provide a structure of the type referred to in which the removal of the reel assembly can be effected by shifting said assembly along substantially horizontal lines, through the open front of the main frame. This construction is of importance, it should be noted, in a power mower, since ordinarily, a substantial part of the power mower structure is disposed immediately above the main frame.

Another object of importance is to provide, in a power mower, a ground wheel mount of an adjustable nature, with the reel assembly being positioned at selected elevations relative to the ground merely by relocation of a pair of ground wheel support studs extending outwardly from opposite sides of the main frame.

Another object is to provide, in a power lawn mower, an adjusting device for the tiltable bed knife of said power mower, which adjusting means will permit the bed knife to be accurately tilted to any one of a substantial number of selected positions, through the medium of a single screw disposed at each side of the structure. The adjusting device devised to accomplish this object is provided with a loose connection to the bed knife which permits the bed knife to swing to any of various positions relative to the adjusting screw, resilient, yielding means being circumposed about the adjusting screw and being adapted to exert pressure against the bed knife tending to hold the bed knife screw against relative movement, in each position of adjustment of the bed knife.

Another object is to provide a power lawn mower having a novel drive means extending from the prime mover or power source to the reel and drive wheels of the device, the drive means including a countershaft which can be bodily shifted to selected positions effective for disengaging a drive belt extending from the motor, from a driven pulley associated therewith.

Other objects will appear from the following description, the claims appended thereto, and from the annexed drawings, in which like reference characters designate like parts throughout the several views, and wherein:

Figure 1 is a rear perspective view of a power mower formed in accordance with the present invention.

Figure 2 is an enlarged top plan view in which parts are shown in section and other parts are broken away;

Figure 3 is a sectional view taken substantially on line 3—3 of Figure 1, on an enlarged scale;

Figure 4 is a sectional view on line 4—4 of Figure 2;

Figure 5 is a detail sectional view taken on line 5—5 of Figure 2, showing the means for driving the ground wheels; and Figure 6 is a detail sectional view taken on line 6—6 of Figure 4, illustrating the separable connection between the reel assembly and main frame.

The lawn mower constituting the present invention can appropriately be considered as comprising four main components or assemblies, namely a reel assembly 10, a main frame 12, an engine 14, and a drive assembly 16.

Each of the above-mentioned assemblies will be described in turn, and considering first the construction of the reel assembly 10, this includes a pair of flat reel frame plates 18 approximately oval in respect to the outer configuration thereof and disposed in vertical planes at opposite sides of the lawn mower structure. The side plates 18 are each provided with a bearing 20 (Figure 6), and journaled at its opposite ends in the respective bearings 20 is a reel shaft 22. The reel shaft 22, adjacent its opposite ends, has end plates or collars 24, and secured fixedly to the reel shaft and spaced longitudinally thereof are blade support plates 26. The blade support plates, as best shown in Figure 3, are notched inwardly at spaced locations about the circumferences thereof as at 26', with each plate 26 having, at the locations of the notches, laterally extended ears 26" to which spirally arranged blades 28 are fixedly secured.

For the purpose of fixedly connecting the side plates 18 of the reel assembly in transversely spaced relation, I provide reel frame tie bars 30, 32. These are rigidly secured at their opposite ends to the respective reel frame side plates, with one of said tie bars constituting a shaft on which the bed knife of the lawn mower is tiltably mounted (Figure 4).

The bed knife is provided, at its opposite ends, with arms 34 receiving the opposite end portions of the tie bar 32, said arms 34 having recesses in their front ends receiving the opposite end portions of said knife member 36. The member 36 extends the full distance between the respective side plates 18 of the reel frame, and fixedly secured to said member 36 is a blade 38. It will be understood that on rocking of the arms 34 about the tie bar 32, the blade 38 will be adjusted to selected positions relative to the blades 28 of the rotary reel.

For the purpose of effecting adjustments of the bed knife to selected positions relative to the reel, the arms 34 are bifurcated as at 40, at their rear ends, and spaced above the bifurcated portions of the arms 34 are stationary brackets 42 secured to the side plates 18 and extending inwardly toward one another from said side plates. The brackets have threaded center openings, in which adjusting screws 44 are engaged. The upper end portions of the screws are threaded into complementarily threaded, downwardly facing sockets formed in sleeve nuts 46, the sleeve nuts 46 being engaged at their lower ends against the brackets 42. Cross pins 48 are extended transversely through the upper end portions of the sleeve nuts, for convenience in rotating the same.

Coil springs 50 are circumposed about the shanks of the adjusting screws, below the respective brackets 42, said coil springs abutting at one end against the undersides of said brackets 42. At their other ends, the springs 50 engage collars 52 loose upon the shanks of the adjusting screws. Collars 52 are held in engagement with the upper surfaces of the bifurcated portions of the arms 34, under the pressure of the springs 50. Underlying said bifurcated portions of the arms are cross heads 54 rigidly secured to the lower ends of the adjusting screws, and it will thus be seen that the cross heads 54 cooperate with the collars 52 in connecting the arms 34 movably to the adjusting screws. It will be apparent that rotation of the adjusting screws in a selected direction will be effective to tilt the bed knife to a desired position relative to the rotary reel. In each position to which the bed knife is tilted, it will be held against movement relative to the adjusting screw, under the pressure of the spring 50 of each adjusting screw. The arrangement, of course, permits the bed knife to be pivoted away from the rotary reel, against the opposing action of the springs 50, this arrangement being desirable in permitting maintenance, cleaning, and sharpening of the bed knife and reel.

The description so far provided has been confined to the reel assembly, and it will be apparent that the reel assembly is a self-contained unit including a reel frame, a rotary reel, a tiltable bed knife, and an adjusting device for said bed knife. It is a part of the present invention that the self-contained reel assembly can be shifted bodily into and out of the main frame 12 of the lawn mower, and the means whereby this bodily movement of the reel assembly is effected will be presently described herein.

Considering now the construction of the main frame, this includes a pair of flat main frame side plates 56, disposed at the opposite sides of the mower in contact with the reel frame side plates 18. The main frame side plates 56 are fixedly connected in transversely spaced relation by a front tie bar 58, an intermediate tie bar 60, and a rear tie bar 62. Any of various means can be employed for fixedly securing the respective tie bars to the main frame side plates, and as one example of such a means, I have shown socket members 64 (Figure 2) that receive the opposite end portions of the rear tie bar 62. The ends of the rear tie bar have axial, threaded sockets receiving screws 66, said screws 66 being extendable inwardly through suitable openings formed in the main frame side plates 56. The front tie bar 68 is similarly secured to the main frame side plates, with the ends of the front tie bar extending into suitable openings formed in socket members 68. Likewise, the ends of the intermediate tie bars 60 are engaged in socket members 70 mounted upon the inner surfaces of the respective main frame side plates 56.

The main frame is equipped with a pair of front ground wheels, and said wheels are mounted upon the main frame side plates for vertical adjustment, thus to adjust the height of the bed knife and rotary reel above the ground surface. The adjustable mounting of the ground wheels has been shown to particular advantage in Figures 1, 4, and 6, and includes flat wheel stud support plates 72 to each of which is welded or otherwise fixedly connected an outwardly extended wheel stud 74. The ground wheels 76 are rotatably mounted upon the studs 74.

The main frame side plates 56 are each provided with a vertical row of openings 78 (Figure 4), and on adjustment of the wheel stud support plates 72 vertically of the rows of openings 78, vertically spaced openings in the plates 72 will be registered with selected, spaced openings 78. Screws or equivalent fastening elements 80 (Figure 6) are extended through the registering openings to secure the plates 72 fixedly to the side plates 56 in selected positions of vertical adjustment.

The means whereby the reel frame is fixedly but separably connected to the main frame will now be described, and includes small, rectangular reinforcing plates 82 apertured for extension therethrough of screws 84 (Figures 4 and 6). The screws 84 extend through openings provided in the main frame side plates 56, the openings of the main frame side plates registering with threaded openings 86 provided in the reel frame side plates 18.

Formed in the rear end portions of the reel frame side plates 18 are notches 88, said notches extending inwardly along substantially horizontal lines and receiving bolts 90. The bolts 90 are extended through openings formed in the main frame side plates 56, and are equipped with nuts 92 adapted to bind against the reel frame side plates.

It will be readily understood that to remove the entire reel assembly 10 from the main frame 12, it is merely necessary that the screws 84 be backed off, out of the openings 86 of the reel frame side plates. The nuts 92 are loosened, and the drive chain of the reel is then disengaged, allowing the entire reel assembly to be moved out of the front of the main frame, through a substantially horizontal path.

It is important to note that the removal of the reel assembly does not require that the reel assembly be lifted along vertical lines, such an arrangement being undesirable in a power mower, since the engine of the mower is generally located directly above the main frame. The removal of the reel assembly is accomplished in the illustrated example without interference with the engine or related parts of the lawn mower structure.

Mounted upon the tie bars 58, 60 is a top plate 94, and mounted upon said top plate is a motor plate 96. The plates 94, 96 are fixedly connected to one another in any suitable manner, and are also fixedly connected to the adjacent portions of the main frame so as to constitute part of said main frame.

The main frame further includes means for connecting a handle to the same, and to this end, ears 98 are fixedly secured to the respective side plates 56, said ears being provided with inwardly extending, threaded studs 100. Immediately in back of the ears 98 are handle support brackets 102, the brackets 102 providing stops limiting downward swinging movement of the lawn mower handle 104. The lawn mower handle 104 has the usual yoke at its inner end, the arms of said yoke being apertured to receive the studs 100.

The above completes the description of the main frame, and reference should now be had to Figure 1, wherein the engine 14 is illustrated. The engine 14 is provided with a drive shaft 106, to which is secured a drive pulley 108 about which is trained a belt 110, said belt 110 passing around a large driven pulley 112 secured to a countershaft 114. The countershaft 114 is journaled in bearing plates 116 (Figure 3), mounted for hinged or swinging movement upon pins 118 carried by bearing support brackets 120 fixedly mounted upon the main frame.

The pulleys 108, 112, belt 110 and countershaft 114 can all be appropriately considered as part of the drive assembly 16. The drive assembly includes, as will be noted from Figure 3, means for shifting the pulley 112 in the direction of the pulley 108, thereby to loosen the belt 110 and disengage said belt 110 from a driving relationship with the pulley 112.

As part of the means for declutching the drive assembly in this manner, I provide an arm 122 pivotally mounted at 124 upon the main frame. A clutch control rod 126 is provided, at its inner end, with a lateral extension 128 received in an opening formed in the arm 122, at a location remote from the pivot pin 124 of said arm 122. The rod 126 extends under the handle 104, for a substantial part of the length of said handle, so as to dispose the outer end of the rod at a location at which it will be readily accessible to a user.

Rigid with the hinged bracket 116 is a flat plate 130, and rigid with the arm 122 is a plate 132 adapted to slidably contact the plate 130. As a result, if the rod 126 is shifted in the direction of its length to the right in Figure 3, the hinged bracket 116 will be swung in a clockwise direction, thereby shifting the countershaft 114 and pulley 112 in the direction of the pulley 108. The belt 110 will thus be allowed to go slack, and will not drive the pulley 112.

Means is provided for normally shifting the pulley 112 and countershaft 114 to the left in Figure 3, so as to hold the belt 110 taut. To this end, a rod 134 is loosely engaged at one end in the upper end portion of a bracket member 136 secured to the motor plate 96. At its other end, the rod is loosely positioned through openings formed in the plates 130, 132. A coil spring 138 is circumposed about the mid-length portion of the rod 134, said spring being in engagement at one end against the bracket member 136 and being engaged against the plate 130. The opposite ends of the rod 134 are threaded, to receive nuts 140, 142, which nuts are adapted to hold the rod in place, the nuts further being adapted to adjust the tension of the spring 138 and the normal position of the countershaft 114.

Secured to the countershaft 114 for rotation thereby is a small pulley 144, about which is trained a belt 146, said belt 146 passing about a driven pulley 148 (Figure 2). The driven pulley 148 is adapted to drive a pair of rear ground wheels 150, and to provide a mounting for the pulley 148 and ground wheels 150, I utilize bushings 152, 154 circumposed about the rear tie bar 62 and spaced longitudinally of said rear tie bar. An elongated sleeve 156 is spaced from the tie bar 62 by the bushings, and is rotatable upon the bushings, the driven pulley 148 being fixedly secured to the sleeve or hollow shaft 156 for rotating the same.

A set collar 158 is secured to the tie bar 62 at a selected location along the length thereof, and abuts against a grease fitting 160, the grease fitting 160 engaging against the hub 162 of one of the ground wheels 150. The hub 162 is secured to its associated ground wheel by means of circumferentially spaced bolts 164. The bolts 164 pass through the flange of the hub 162, through the body of the adjacent ground wheel 150, and through openings spaced circumferentially of a ratchet wheel 166 (Figure 5).

The ratchet wheel 166 has an outer series of ratchet teeth 168, and an inner series of ratchet teeth 170. A pawl 172 is disposed in the space between the inner and outer series of ratchet teeth, and is slidable between fork arms 174 secured to and projecting outwardly from a disc 176 rigid with the driven pulley 148. The opposite face of the driven pulley is similarly equipped with a wheel 176, and the other ground wheel 150 is formed with a ratchet wheel 166 also having a driving connection with the driven pulley.

This construction permits the driven pulley to drive the respective drive wheels 150, while at the same time providing a differential action between the ground wheels.

A grease fitting 178 is engaged against said other ground wheel 150, and cooperating with the set collar 158 in holding the ground wheels and grease fittings in place is a set collar 180 circumposed about the sleeve 156.

At one end, the sleeve 156 is secured by a coupling 182 to the hub 184 of a sprocket 186 about which is trained a chain 188. Chain 188 is engaged with a reel sprocket 190 that is secured to the reel shaft 22.

It will be seen that the arrangement provides an efficiently operating drive assembly, whereby drive is transmitted to the reel and to the rear ground wheels 50, the rear ground wheels having a differential to facilitate operation of the lawn mower.

It is believed obvious from the detailed description which has been hereinbefore provided that the lawn mower formed in accordance with the present invention can be manufactured at relatively low cost, while at the same time being possessed of certain highly desirable characteristics not found, to my knowledge, in conventional lawn mowers now in use. An inexpensive, easily operated clutch means is embodied in the structure, for controlling the driving of the reel and rear ground wheels, said clutch means being so designed as to bodily shift an intermediate pulley and its associated counter or jack shaft to selected positions relative to driving and driven parts associated therewith.

Further, the lawn mower is so designed as to permit the reel assembly to be bodily removed therefrom, merely by removing the screws 84 and loosening the nuts 92. The reel assembly can, of course, be removed without affecting the remaining parts of the structure, and extensive disassembly of the lawn mower, such as is now required, is not involved. Still further, the lawn mower includes a novelly designed adjusting device for the tiltable bed knife, which adjusting device allows the bed knife to be tilted away from the cutting blades of the rotary reel whenever sharpening or maintenance is involved, the springs 50 automatically acting to return the bed knife to its previously determined position of adjustment relative to the rotary reel, after sharpening and maintenance is completed.

Further, the setting of the lawn mower for different heights of grass to be cut does not require relative adjustment of the parts of the reel or bed knife, and adjustments of this type can be readily effected by mounting the front ground wheels at selected elevations on the side plates 56 of the main frame.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a lawn conditioning machine of the reel type, a main frame having an open front and including a pair of side plates fixedly connected in spaced relation; a reel assembly including a reel frame adapted to be bodily shifted along a generally horizontal path through said open front to a position within the space between said side plates, the reel frame having a pair of side plates disposed flat against the main frame side plates in said position of the reel assembly and a plurality of reel frame tie bars rigidly secured at their opposite ends to and extending between the respective reel frame side plates; fastening elements removably extended through the contacting reel frame and main frame side plates, to separably connect the reel frame to the main frame in said position of the reel assembly, and a bed knife extending between the reel frame side plates and tiltably mounted upon one of said tie bars.

2. In a lawn conditioning machine of the reel type, a main frame having an open front and including a pair of side plates fixedly connected in spaced relation; a reel assembly including a reel frame adapted to be bodily shifted along a generally horizontal path through said open front to a position within the space between said side plates, the reel frame having a pair of side plates disposed flat against the main frame side plates in said position of the reel assembly, the reel frame and main frame side plates having apertures adjacent said open front registering in said position of the reel frame, said reel frame side plates having notches extending inwardly along substantially horizontal lines from portions of the reel frame side plates remote from said open front; fastening elements removably extended through the registering apertures to separably connect the reel frame and main frame side plates adjacent said open front; and additional fastening elements extending through the main frame side plates into said notches to cooperate with the first-named fastening elements in connecting the reel assembly and main frame.

3. In a lawn conditioning machine of the reel type, a main frame having an open front and including a pair of side plates fixedly connected in spaced relation; a reel assembly including a reel frame adapted to be bodily shifted along a generally horizontal path through said open front to a position within the space between said side plates, the reel frame including a pair of side plates disposed flat against the main frame side plates in said position of the reel assembly, and a plurality of reel frame tie bars rigidly secured at their opposite ends to and extending between the respective reel frame side plates, the reel frame and main frame side plates having apertures adjacent said open front registering in said position of the reel frame, said reel frame side plates having notches extending inwardly along substantially horizontal lines from portions of the reel frame side plates remote from said open front; fastening elements removably extended through the registering apertures to separably connect the reel frame and main frame side plates adjacent said open front; additional fastening elements extending through the main frame side plates into said notches to cooperate with the first named fastening elements in connecting the reel assembly and main frame; and a bed knife having a longitudinal bore extending therethrough, one of said tie bars extending through said bore, said bed knife extending between the reel frame side plates and being tiltably mounted upon its associated tie bar.

References Cited in the file of this patent

UNITED STATES PATENTS

| | | |
|---|---|---|
| 1,486,758 | Jerram | Mar. 11, 1924 |
| 1,819,133 | Stegeman et al. | Aug. 18, 1931 |
| 2,282,837 | Wahrenbock | May 12, 1942 |
| 2,283,161 | Booton | May 19, 1942 |
| 2,532,076 | Raney et al. | Nov. 28, 1950 |
| 2,564,201 | Hainke | Aug. 14, 1951 |
| 2,601,753 | Ziff | July 1, 1952 |
| 2,651,904 | Jatium | Sept. 15, 1953 |